United States Patent [19]

Evans

[11] Patent Number: 5,549,181

[45] Date of Patent: Aug. 27, 1996

[54] BRAKE SHOE RETRACTOR CLIP FOR DISC BRAKE ASSEMBLY

[75] Inventor: Anthony C. Evans, Northville, Mich.

[73] Assignee: Kelsey-Hayes Company, Romulus, Mich.

[21] Appl. No.: 305,236

[22] Filed: Sep. 13, 1994

[51] Int. Cl.⁶ .......................... F16D 55/224; F16D 65/02
[52] U.S. Cl. ...................... 188/72.3; 188/216; 188/73.38
[58] Field of Search .................................. 188/71.1, 72.3, 188/73.31, 73.35–73.38, 205 A, 216, 250 E, 369, 370; 192/70.28

[56]        References Cited

U.S. PATENT DOCUMENTS

| 3,605,956 | 9/1971 | Hahm et al. | 188/216 X |
| 4,364,455 | 12/1982 | Oshima | 188/1.11 W |
| 4,415,068 | 11/1983 | Gumkowski et al. | 192/70.28 X |
| 4,491,204 | 1/1985 | Dirauf et al. | 188/73.38 |
| 4,629,037 | 12/1986 | Madzgalla et al. | 188/71.8 |
| 4,658,938 | 4/1987 | Thiel et al. | 188/73.38 |
| 4,867,280 | 9/1989 | Von Gruenberg et al. | 188/72.4 |
| 4,940,119 | 7/1990 | Kondo et al. | 188/73.31 |
| 5,069,313 | 12/1991 | Kato et al. | 188/72.3 |
| 5,249,647 | 10/1993 | Kobayashi et al. | 188/72.3 |
| 5,251,727 | 10/1993 | Loeffler et al. | 188/73.38 X |
| 5,310,024 | 5/1994 | Takagi | 188/73.36 X |

FOREIGN PATENT DOCUMENTS

| 3130185 | 4/1982 | Germany | 188/72.3 |
| 42251 | 12/1971 | Japan | 188/73.38 |
| 303680 | 9/1968 | Sweden | 188/72.3 |
| 1425269 | 2/1976 | United Kingdom | 188/73.38 |
| 2257483 | 1/1993 | United Kingdom | 188/72.3 |
| 93/15331 | 8/1993 | WIPO | 188/73.38 |

*Primary Examiner*—Douglas C. Butler
*Attorney, Agent, or Firm*—MacMillan, Sobanski & Todd

[57]                ABSTRACT

A retraction mechanism for a disc brake assembly which applies a generally constant restoring force urging the brake shoes apart from one another regardless of the amount of wear of the friction pads. The disc brake assembly includes an anchor plate upon which a caliper is slidably mounted. The caliper is formed having an inboard leg and an outboard leg. A cylindrical recess is formed in the inboard leg of the caliper, within which a piston is slidably supported. A pair of brake shoes are disposed adjacent to the inboard and outboard legs of the caliper, and a rotor connected to a rotatable wheel extends therebetween. A mechanism is provided for selectively moving the brake shoes into frictional engagement with the rotor to retard or stop rotation thereof. The retraction mechanism includes a pair of retractor clips which are mounted on the anchor plate for spreading the brake shoes apart from one another when the disc brake assembly is subsequently released. The retractor clips are serpentine-like in shape, having straight portions which are connected together by intermediate curved portions. The outer ends of the retractor clips terminate upwardly extending post portions and outwardly extending finger portions which engage the brake shoes. The forces exerted by the retractor clips on the brake shoes are substantially uniform, regardless of the amount of wear on friction pads of the brake shoes. Thus, such forces cannot overcome the urging of a roll-back seal and undesirably move the piston away from the rotor by a distance which is greater than a desired predetermined distance.

9 Claims, 4 Drawing Sheets 27,549,181

BRAKE SHOE RETRACTOR CLIP FOR DISC BRAKE ASSEMBLY

BACKGROUND OF THE INVENTION

This invention relates in general to vehicle disc brake assemblies and in particular to an improved structure for a brake shoe retractor adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes an anchor plate which is secured to a fixed, non-rotatable component of the vehicle. A pair of brake shoes are supported on the anchor plate for sliding movement relative thereto. The brake shoes have respective friction pads which are disposed on opposite sides of a rotor. The rotor, in turn, is connected to the wheel of the vehicle for rotation therewith. To effect braking action, the brake shoes are moved inwardly toward one another so as to frictionally engage the opposed sides of the rotor. Such frictional engagement causes retarding or stopping of the rotational movement of the rotor and, therefore, the wheel of the vehicle in a controlled manner.

To accomplish this, the disc brake assembly further includes a caliper assembly for selectively moving the brake shoes into frictional engagement with the rotor. The caliper assembly includes a pair of pins having outer ends which are secured to the anchor plate. The inner ends of the pins extend inwardly away from the anchor plate and the vehicle wheel. A caliper is supported on the pins for sliding movement relative to the anchor plate. The caliper is generally C-shaped, having an inboard leg disposed adjacent the inboard brake shoe and an outboard leg disposed adjacent to the outboard brake shoe. One or more hydraulically or pneumatically actuated pistons are provided in respective cylindrical recesses formed in the inboard leg of the caliper adjacent to the inboard brake shoe. When the brake pedal is depressed, the piston and the inboard leg of the caliper are urged apart from one another. Specifically, the piston is urged outwardly, while the inboard leg of the caliper is urged inwardly. As mentioned above, the piston is disposed adjacent to the inboard brake shoe and, therefore, urges it outwardly toward the inner side of the rotor. Because the caliper is slidably mounted on the pins of the anchor plate, the outboard leg of the caliper (and, thus, the outboard brake shoe disposed adjacent thereto) are urged inwardly toward the outer side of the rotor. As result, the brake shoes frictionally engage the opposed sides of the rotor.

Frequently, an annular roll-back seal is provided within the cylindrical recess in contact with the outer surface of the piston. The roll-back seal is conventional in the art and performs several functions. First, the roll-back seal provides a seal to define the extent of the cylindrical recess within which the piston is disposed. Second, the roll-back seal is designed to retract the piston inwardly away from the rotor by a predetermined distance from the fully engaged position when the brake pedal is released after being depressed. To accomplish this, the roll-back seal frictionally engages the outer surface of the piston, resiliently resisting movement thereof when the brake pedal is depressed. Thus, when the brake pedal is released by the operator of the vehicle, the resilience of the roll-back seal causes the piston to retract within the cylindrical recess and out of contact with the inboard brake shoe.

It has been found with repeated usage, the friction pads of the brake shoes wear and become increasingly thinner. When this occurs, the piston and the caliper must move greater distances relative to one another to effect the same braking action as when the friction pads were new. Despite this increased distance of movement of the piston in the outboard direction, it is desirable that the roll-back seal retract the piston only by the same predetermined distance away from the rotor in the inboard direction. Thus, known roll-back seals are designed to accommodate increased movement of the piston in the outboard direction when the brake pedal is depressed, but to retract the piston inwardly by approximately the same predetermined distance when the brake pedal is subsequently released.

Ideally, when the brake pedal is released, the brake shoes should also be spread apart from one another to prevent any incidental frictional engagement with the rotor. To accomplish this, it is known to provide the disc brake assembly with one or more retraction springs for moving the brake shoes apart from one another when the brake pedal is released. For example, U.S. Pat. Nos. 4,364,455 to Oshima, 4,491,204 to Dirauf et al., 4,629,037 to Madzgalla et al., 4,658,938 to Thiel et al., 4,867,280 to Von Gruenberg et al., 4,940,119 to Kondo et al., 5,069,313 to Kato et al., 5,249,647 to Kobayashi et al., and 5,251,727 to Loeffler et al. all disclose disc brake assemblies which include a retraction spring structure. It is desirable that such retraction springs exert an amount of force which is large enough to urge the brake shoes apart from one another, but small enough not to overcome the roll-back seal to move the piston deeper within the associated cylindrical recess formed in the inboard leg of the caliper.

Unfortunately, when the friction pads of the brake shoes wear thinner as described above, conventional retraction springs are compressed to a greater extent when the friction pads of the brake shoes are worn than when they are new. The additional compression of known retraction springs can result in the exertion of a force against the brake shoe which can overcome the roll-back seal and undesirably move the piston away from the rotor by a distance which is greater than the predetermined distance discussed above. Thus, it would be desirable to provide an improved retraction mechanism for use in a disc brake assembly which applies a generally constant restoring force urging the brake shoes apart from one another regardless of the amount of wear of the friction pads.

SUMMARY OF THE INVENTION

This invention relates to an improved structure for a retraction mechanism adapted for use in a disc brake assembly which applies a generally constant restoring force urging the brake shoes apart from one another regardless of the amount of wear of the friction pads. The disc brake assembly includes an anchor plate upon which a caliper is slidably mounted. The caliper is formed having an inboard leg and an outboard leg. A cylindrical recess is formed in the inboard leg of the caliper, within which a piston is slidably supported. A pair of brake shoes are disposed adjacent to the inboard and outboard legs of the caliper, and a rotor connected to a rotatable wheel extends therebetween. Means are provided for selectively moving the brake shoes into frictional engagement with the rotor to retard or stop rotation thereof. The retraction mechanism includes a pair of retractor clips which are mounted on the anchor plate for spreading the brake shoes apart from one another when the disc brake assembly is subsequently released. The retractor clips are serpentine-like in shape, having straight portions which are connected together by intermediate curved portions. The outer ends of the retractor clips terminate in upwardly extending post portions and outwardly extending finger portions which engage the brake shoes. The forces exerted by the retractor clips on the brake shoes are substantially uniform, regardless of the amount of wear on friction pads of the brake shoes. Thus, such forces cannot overcome the roll-back seal and undesirably move the piston away from the rotor by a distance which is greater than a desired predetermined distance.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
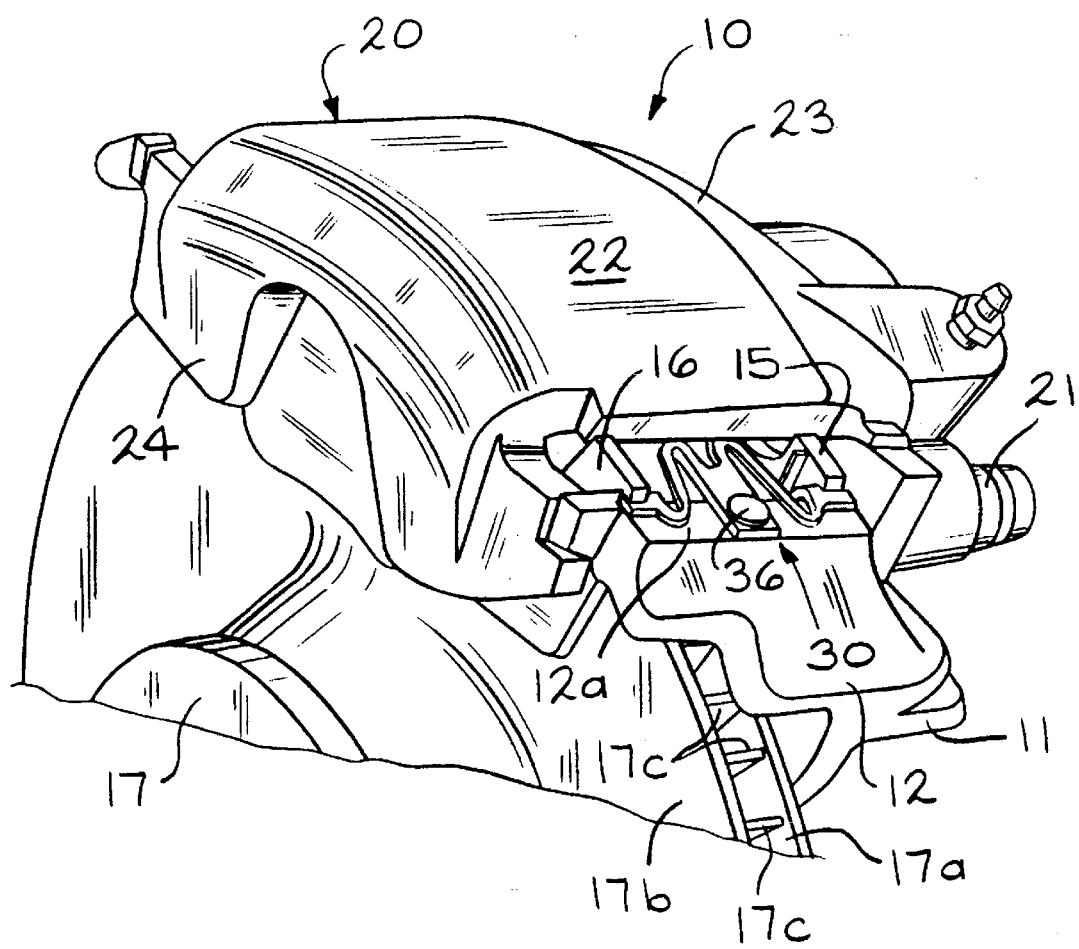
FIG. 1 is a perspective view of a portion of a vehicle disc brake assembly including an improved retractor mechanism in accordance with this invention.
Figure 2:
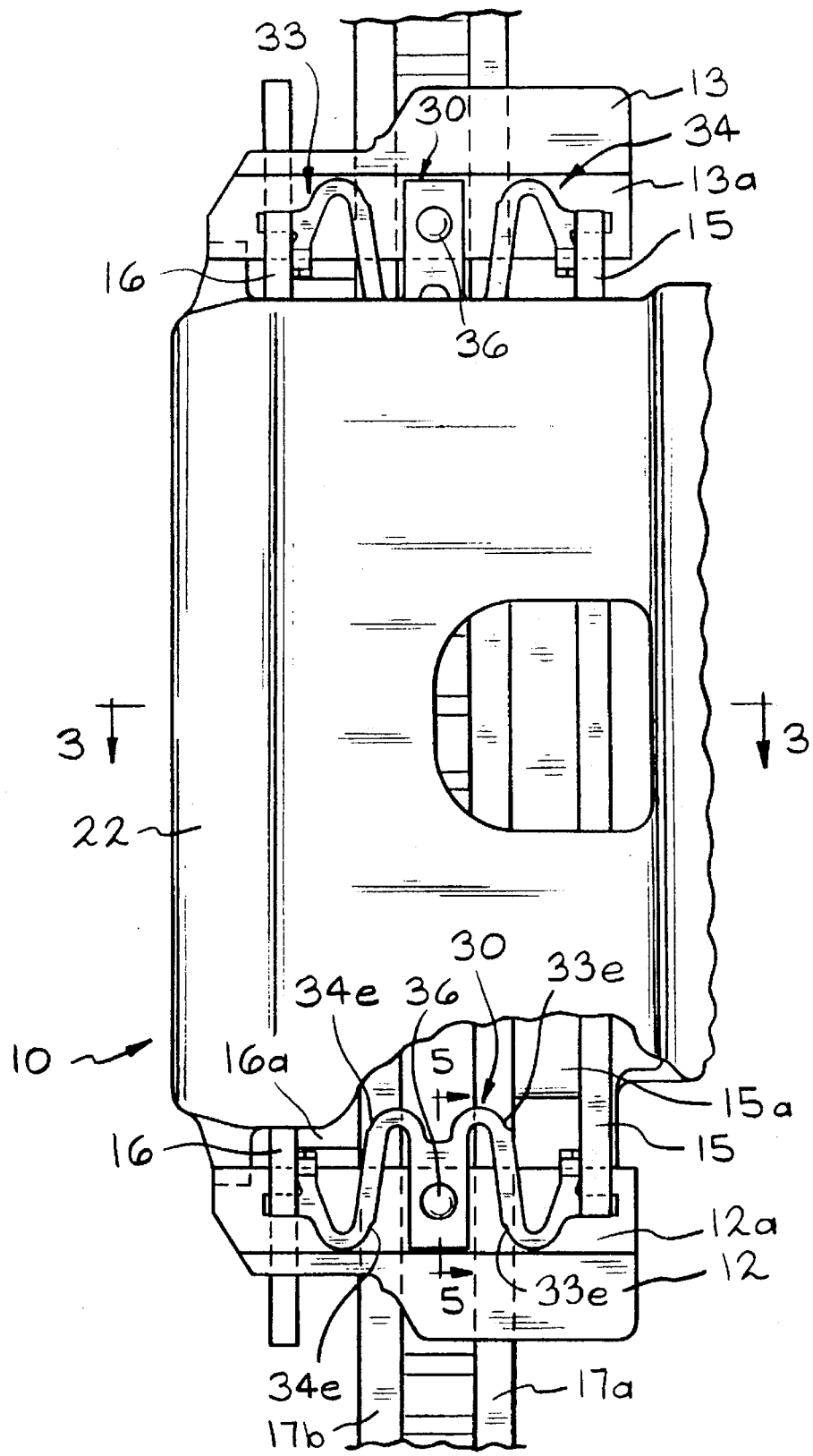
FIG. 2 is a top plan view, partially broken away, of a portion of the disc brake assembly illustrated in FIG. 1.
Figure 3:
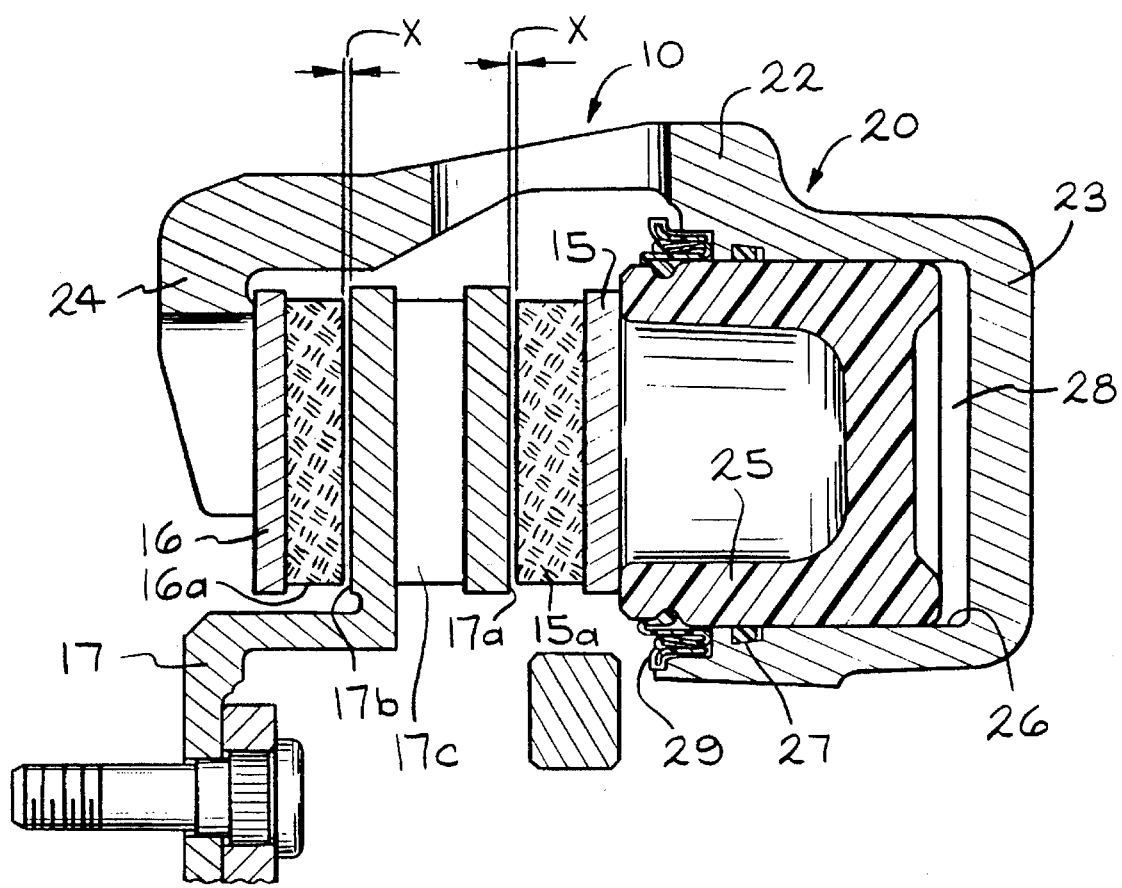
FIG. 3 is a sectional elevational view of a portion of the disc brake assembly taken along line 3—3 of FIG. 2.

Referring now to the drawings, there is illustrated in FIGS. 1 through 3 a portion of a vehicle disc brake assembly, indicated generally at 10. The general structure and operation of the disc brake assembly 10 is conventional in the art. Thus, only those portions of the disc brake assembly 10 which are necessary for a full understanding of this invention will be explained and illustrated. Although this invention will be described and illustrated in conjunction with the particular vehicle disc brake assembly disclosed herein, it will be appreciated that this invention may be used in conjunction with other disc brake assemblies.

The disc brake assembly 10 includes an anchor plate 11 which is secured to a fixed, non-rotatable component of the vehicle (not shown). The anchor plate 11 includes a pair of outwardly extending arms 12 and 13. The arms 12 and 13 have respective upstanding guide rails 12a and 13 a formed thereon. The guide rails 12a and 13a extend transverse to the arms 12 and 13 and extend parallel to one another. A pair of brake shoes 15 and 16 are supported on the guide rails 12a and 13a of the anchor plate 11 for sliding movement relative thereto. The inboard brake shoe 15 includes a backing plate having a friction pad 15a secured thereto. Similarly, the outboard brake shoe 16 includes a backing plate having a friction pad 16a secured thereto. As best shown in FIG. 3, the brake shoes 15 and 16 are disposed on opposite sides of a rotor 17. The rotor 17 is generally flat and circular in shape and is secured in a conventional manner to a rotatable wheel (not shown) of the vehicle. The illustrated rotor 17 includes a pair of opposed braking discs 17a and 17b which are spaced apart from one another by a plurality of intermediate vanes 17c in a known manner.

To effect braking action of the wheel, means are provided for selectively moving the brake shoes 15 and 16 inwardly toward one another so as to frictionally engage the opposed sides of the rotor 17. In the illustrated embodiment, this means for selectively moving the brake shoes 15 and 16 includes a caliper assembly, indicated generally at 20. The caliper assembly 20 includes a pair of pins, one of which is illustrated at 21 in FIG. 1. The outboard ends of the pins 21 are threaded into the anchor plate 11. The inboard ends of the pins 21 extend inwardly away from the anchor plate 11 and the vehicle wheel. A caliper 22 is supported on the pins 21 for sliding movement relative to the anchor plate 11. The caliper 22 is generally C-shaped, having an inboard leg 23 disposed adjacent the inboard brake shoe 15 and an outboard leg 24 disposed adjacent to the outboard brake shoe 16. The pins 21 permit the caliper 22 to slide in both the outboard direction (left when viewing FIG. 3) and the inboard direction (right when viewing FIG. 3). Such sliding movement of the caliper 22 occurs when the disc brake assembly 10 is actuated, as will be explained below.

Means are provided for actuating the disc brake assembly 10 so as to selectively move the brake shoes 15 and 16 into frictional engagement with the rotor 17. In the illustrated embodiment, this actuating means includes a piston 25 which is disposed in a cylindrical recess 26 formed in the outboard facing surface of the inboard leg 23 of the caliper 22. A fluid seal 27 is disposed in an annular groove formed in the side wall of the cylindrical recess 26 and engages the outer side wall of the piston 25. The fluid seal 27 is provided to define a sealed hydraulic actuator chamber 28, within which the piston 25 is disposed for sliding movement. Also, the fluid seal 27 is designed to function as a roll-back seal which retracts the piston 25 within the cylindrical recess 26 when the disc brake assembly 10 is not actuated. Thus, it will be appreciated that the illustrated actuating means is a hydraulic actuating means. However, other well known types of actuating means, such as pneumatic, electrical, and mechanical, can be used. A dust boot seal 29 is provided about the outboard end of the piston 25 to prevent water, dirt, and other contaminants from entering into the cylindrical recess 26. The dust boot seal 29 is formed from a flexible material and has a first end which engages the piston 25 and a second end which engages the inboard leg 23 of the caliper 22. A plurality of flexible convolutions are provided in the dust boot seal 29 between the first and second ends thereof to accommodate movement of the piston 25 relative to the inboard leg 23 of the caliper 22.

When it is desired to actuate the disc brake assembly 10 to retard or stop the rotation of the brake rotor 17 and the vehicle wheel associated therewith, the driver of the vehicle depresses the brake pedal (not shown). In a manner which is well known in the art, the depression of the brake pedal causes pressurized hydraulic fluid to be introduced into the chamber 28. Such pressurized hydraulic fluid urges the piston 25 in the outboard direction (toward the left when viewing FIG. 3) into engagement with the inboard brake shoe 15. As a result, the friction pad 15a of the inboard brake shoe 15 is moved into frictional engagement with the inboard braking disc 17a of the rotor 17. At the same time, the caliper 22 slides on the pins 21 in the inboard direction (toward the right when viewing FIG. 3) such that the outboard leg 24 thereof moves the friction pad 16a of the outboard brake shoe 16 into frictional engagement with the outboard braking disc 17b of the brake rotor 17. As a result, the rotor 17 is frictionally engaged by the friction pads 15a and 16a to retard relative rotational movement thereof. The structure and operation of the disc brake assembly 10 thus far described is conventional in the art.

Figure 4:
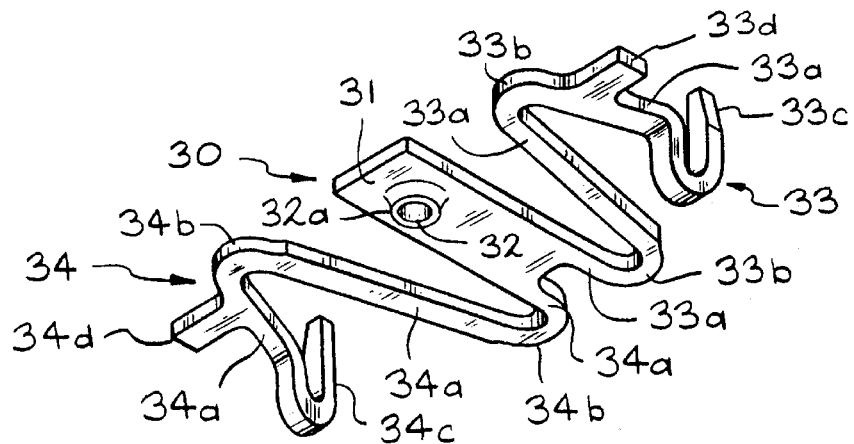
FIG. 4 is a perspective view of the retractor mechanism illustrated in FIGS. 1 and 2.
Figure 5:
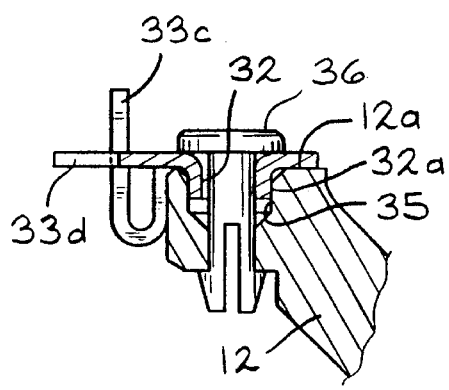
FIG. 5 is a sectional elevational view of a portion of the disc brake assembly taken along line 5—5 of FIG. 2.

The disc brake assembly 10 further includes a retraction mechanism which applies a generally constant force to urge the two brake shoes 15 and 16 apart from one another when the brake pedal is released. The retraction mechanism includes a pair of retractor clips 30 which, as best shown in FIG. 2 are disposed on opposite sides of the caliper 22. The illustrated retractor clips 30 are identical in structure and operation, although such is not required. The retractor clips 30 are preferably stamped from a flat strip of SAE 1010 carbon steel. However, other materials, such as for example brass, can be used. Each of the retractor clips 30 is formed having a central mounting portion 31 having an aperture 32 formed therethrough. Preferably, a circumferential lip 32a is formed about the aperture 32 on the lower surface of the central mounting portion 31, as shown in FIGS. 4 and 5. The purposes for the aperture 32 and the lip 32a will be explained below.

Each of the retractor clips 30 is further formed having a pair of arms, indicated generally at 33 and 34, which extend outwardly from the central mounting portion 31. In the preferred embodiment, the arms 33 and 34 are identical to one another, each being serpentine-like in shape. The arm 33 has a plurality of generally straight portions 33a which are connected together by intermediate curved portions 33b. In the illustrated embodiment, the arm 33 is formed having three straight portions 33a and two curved portions 33b. However, it will be appreciated that the arm 33 may be formed having a greater or lesser number of such straight portions 33a and curved portions 33b. For example, the arm 33 may be formed having as few as two straight portions 33a which are connected together by a single curved portion 33b. In the illustrated embodiment, the arm 34 is formed having a similar plurality of straight portions 34a and intermediate curved portions 33b. Although it is preferable that the arms 33 and 34 be identical, the number of straight portions 33a and curved portions 33b of the first arm 33 may be different frown the number of straight portions 34a and curved portions 34b of the second arm 34 if desired. Alternatively, the arms 33 and 34 of the retractor clips 30 can be formed differently from one another so as to apply different magnitudes of forces against the brake shoes 15 and 16 if desired.

The outer end of the first arm 33 terminates in a post portion 33c and in a finger portion 33d. The post portion 33c extends upwardly from the arm 33, generally perpendicular from a plane defined by the retractor clip 30. The finger portion 33d extends outwardly away from the central mounting portion 31 in the plane defined by the retractor clip 30. The outer end of the second arm 34 preferably terminates in a similar upwardly extending post portion 34c and an outwardly extending finger portion 34d. The purposes of the post portions 33c and 34c and the finger portions 33d and 34d is to facilitate engagement of the ends of the retractor clips 30 with the brake shoes 15 and 16, as will be explained below.

Figure 6:
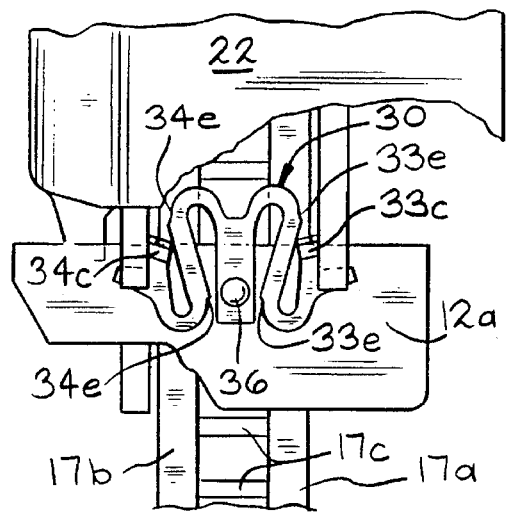
FIG. 6 is a fragmentary top plan view similar to FIG. 2 showing the retractor mechanism in a compressed condition.

As best shown in FIGS. 2 and 6, the thickness of the straight portion 33a and 34a of each of the illustrated retractor clips 30 is larger than the thickness of the intermediate curved portions 33b and 34b. As a result, transition regions 33e and 34e are defined at the junction of each of the straight portions 33a and 34a with the adjacent intermediate curved portions 33b and 34b. The transition regions 33e and 34e are characterized by thicknesses which vary smoothly from the relatively larger thicknesses of the straight portion 33a and 34a to the relatively smaller thicknesses of the intermediate curved portions 34.

When installed as shown in FIGS. 1 and 2, each of the retractor clips 30 engages both the inboard brake shoe 15 and the outboard brake shoe 16 to urge them apart from one another. Specifically, the upstanding post portion 33c of the first arm 33 of one of the retractor clips 30 abuts an axial edge of one end of the inboard brake shoe 15. At the same time, the outwardly extending finger portion 33d of the first arm 33 extends over a circumferential edge of the same end of the inboard brake shoe 15. Similarly, the upstanding post portion 34c of the second arm 34 abuts an axial edge of one end of the outboard brake shoe 16, while the outwardly extending finger portion 34d extends over a circumferential edge of the same end of the outboard brake shoe 16. The other retractor clip 30 engages the opposite ends of the inboard and outboard brake shoes 15 and 16 in a mirror image-like manner.

The retractor clips 30 are respectively supported on and secured to the guide rails 12a and 13a of the arm 12 and 13 of the anchor plate 11. To accomplish this, an aperture 35 is foraged in the middle of each of the guide rails 12a and 13a, as shown in FIG. 5. At least a portion of the aperture 35 is sized to snugly receive the lip 32a formed about the aperture 32 of the retractor clip 30. The cooperation of the lips 32a with their upper portions of the associated apertures 35 prevent movement of the retractor clips 30 relative to the associated guide rails 12a and 13a. In addition, a fastener 36 extends through the aperture 32 formed through each of the central mounting portions 31 of the retractor clips 30 and through the associated apertures 35 formed through the guide rails 12a and 13a to retain the mounting clips 30 thereon. In the illustrated embodiment, the fasteners 36 are illustrated as being of the bayonet type, having enlarged lower portions which extend completely through the apertures 35 and engage the lower surfaces of the arms 12 and 13 of the anchor plate 11. However, other types of fasteners may be used to accomplish this purpose.

Preferably, the arms 33 and 34 of the retractor clips 30 are slightly compressed between the inboard and outboard brake shoes 15 and 16 when the disc brake assembly is not actuated, as shown in FIG. 3. In this condition, bending moments are created at the intermediate curved portions 33b and 34b of the arms 33 and 34. Inasmuch as the illustrated retractor clip 30 is formed from a generally flat stamping, as described above, it will be appreciated that the bending moments created at the intermediate curved portions 33b and 34b are manifested as tensions and compressions of the material used to form the retractor clip 30 which lie generally in the same plane defined by the retractor clip 30. This is usually referred to as beam bending. This invention contemplates that the retractor clip 30 may be formed in such a manner as to creates tensions and compressions which do not lie generally in the same plane defined by the retractor clip 30. This is usually referred to as torsion bending.

In operation, the brake shoes 15 and 16 are moved inwardly toward one another when the disc brake assembly 10 is actuated, as described above. As a result, the retractor clips 30 yield slightly at the intermediate curved portions 33b and 34b, becoming permanently deformed. However, because of the inherent resiliency of the material used to form the clips 30 and the structures of the arms 33 and 34, the clips 30 remain operative to exert a predetermined magnitude of force against each of the brake shoes 15 and 16, urging them apart from one another. Thus, the clips 30 "spring back" and apply a restoring force sufficient to spread the brake shoes 15 and 16 apart from one another when the disc brake assembly 10 is subsequently released. Specifically, the clips 30 are operative to evenly divide the amount of piston roll back in order to maintain a predetermined clearance, indicated as X in FIG. 3, between the brake shoes 15 and 16 and the associated braking discs 17a and 17b when the disc brake assembly 10 is subsequently released. For example, the typical roll back of the piston 25 by the seal 27 is in the range of 0.010 to 0.015 inch, resulting in a predetermined clearance X which is in the range of 0.005 to 0.007 inch. However, the forces exerted by the retractor clips 30 are not sufficient to overcome the roll-back seal 27 to move the piston 25 deeper within the cylindrical recess 26 formed in the inboard leg 23 of the caliper 22, as discussed above.

As mentioned above, the friction pads 15a and 16a of the brake shoes 15 and 16 wear and become increasingly thinner with repeated usage of the disc brake assembly 10. When this occurs, the brake shoes 15 and 16 must move closer toward one another when the brake pedal is depressed in order to frictionally engage the rotor 17. Notwithstanding this, the retractor clips 30 are effective to apply substantially the same magnitude of force against the brake shoes 15 and 16 to spread them apart from one another. To accomplish this, the retractor clips 30 are increasingly permanently deformed as the friction pads 15a and 16a wear thinner. Thus, even after substantial wear of the friction pad 15a and 16a has occurred and the retractor clips 30 are increasing permanently deformed, as illustrated in FIG. 6, the retractor clips 30 exert approximately the same amount of force against the brake shoes 15 and 16 as they exerted when the friction pads 15a and 16a were not worn. As a result, the forces exerted by the retractor clips 30 remain sufficient to move the brake shoes 15 and 16 apart from one another by the predetermined clearance X, but insufficient to overcome the roll-back seal 27 to move the piston 25 deeper within the cylindrical recess 26 formed in the inboard leg 23 of the caliper 22, as discussed above.

While the present invention has been illustrated and described in connection with a "sliding" caliper type of disc brake assembly, the invention may be used with other disc brake assemblies. For example, the invention may be used in connection with a "fixed" caliper type of disc brake assembly (not shown). When used on a fixed caliper disc brake assembly, the retractor mechanisms can be supported on and secured to the brake caliper (not shown).

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A disc brake assembly adapted to frictionally engage a rotor connected to a vehicle wheel comprising:

an anchor plate;

a caliper carried on said anchor plate;

a pair of friction pads carried on one of said caliper and said anchor plate, said friction pads adapted to be disposed on opposite sides of the rotor;

means for selectively moving said friction pads toward one another so as to frictionally engage the rotor; and a retraction mechanism for moving said friction pads apart from one another when said means for selectively moving is not operated so as to maintain a predetermined spaced apart relationship therebetween, said retraction mechanism including a retractor clip having a mounting portion which is fixed in position relative to said anchor plate at a location substantially outside the confines of said caliper, said retractor clip further including a pair of arms extending from said mounting portion which engage said friction pads, each of said arms of said retractor clip being elastically deformed when said friction pads are moved a predetermined distance toward one another so as to move said friction pads apart from one another when said means for selectively moving is not operated, each of said arms of said retractor clip being permanently deformed when said friction pads are moved more than said predetermined distance toward one another so as to maintain said predetermined spaced apart relationship.

2. The disc brake assembly defined in claim 1 wherein said anchor plate includes a guide rail and said retraction clip is fixed in position relative to said guide rail.

3. The disc brake assembly defined in claim 2 wherein said guide rail includes an aperture formed thereto having a predetermined inner diameter, and said mounting portion of said retraction clip includes a mounting boss having a predetermined outer diameter which is generally equal to said inner diameter of said aperture so as to receive said mounting boss in an interference fit therein thereby securing said retraction clip on said guide rail.

4. The disc brake assembly defined in claim 3 wherein a fastener extends through said aperture and said boss to positively secure said retraction clip on said guide rail.

5. The disc brake assembly defined in claim 1 wherein each of said friction pads is secured to a backing plate, and each of said arms of said retractor clip engages each of said backing plates.

6. The disc brake caliper assembly defined in claim 5 wherein each of said arms includes a first portion which engages an axial edge of each of said backing plates and a second portion which engages a circumferential edge of each of said backing plates.

7. The disc brake assembly defined in claim 5 wherein said arms of said retraction clip are identical to one another.

8. The disc brake assembly defined in claim 1 wherein said retraction clip is generally serpentine-shaped.

9. The disc brake assembly defined in claim 1 wherein each of said arms of said retraction clip includes an outwardly extending finger and an upwardly extending post.

* * * * *